United States Patent
Kleiman

(10) Patent No.: US 7,884,980 B2
(45) Date of Patent: Feb. 8, 2011

(54) SYSTEM FOR CAPTURING GRAPHICAL IMAGES USING HYPERSPECTRAL ILLUMINATION

(76) Inventor: Larry Kleiman, 2407 Third Ave., Suite 2R, Bronx, NY (US) 10451

( * ) Notice: Subject to any disclaimer, the term of this patent is extended or adjusted under 35 U.S.C. 154(b) by 0 days.

(21) Appl. No.: 12/540,009

(22) Filed: Aug. 12, 2009

(65) Prior Publication Data

US 2009/0322908 A1 Dec. 31, 2009

Related U.S. Application Data

(62) Division of application No. 10/755,131, filed on Jan. 9, 2004, now Pat. No. 7,583,419.

(60) Provisional application No. 60/438,909, filed on Jan. 9, 2003.

(51) Int. Cl.
  G06F 15/00 (2006.01)
  G03F 3/08 (2006.01)
  H04N 1/46 (2006.01)
  G01J 1/36 (2006.01)
  G01D 18/00 (2006.01)

(52) U.S. Cl. .................. 358/520; 358/1.9; 358/509; 250/205; 250/252.1

(58) Field of Classification Search ............... 358/1.9, 358/520, 516, 529, 523, 509, 511; 356/302, 356/317, 319, 326; 702/116, 126; 382/162, 382/167; 250/252.1, 318, 204, 559.06
See application file for complete search history.

(56) References Cited

U.S. PATENT DOCUMENTS

| | | | |
|---|---|---|---|
| 3,638,025 A | 1/1972 | Dishington et al. | |
| 3,800,303 A | 3/1974 | Picquendar et al. | |
| 5,319,472 A | 6/1994 | Hill et al. | |
| 5,384,901 A | 1/1995 | Glassner et al. | |
| 5,502,580 A | 3/1996 | Yoda et al. | |
| 5,506,696 A | 4/1996 | Nakano | |
| 5,539,517 A | 7/1996 | Cabib et al. | |
| 5,642,191 A | 6/1997 | Mende | |
| 5,724,135 A | 3/1998 | Bernhardt | |
| 5,926,283 A | 7/1999 | Hopkins | |
| 6,088,085 A | 7/2000 | Wetteborn | |
| 6,111,640 A * | 8/2000 | Hedman et al. | ............. 356/300 |
| 6,160,618 A | 12/2000 | Garner | |
| 6,208,767 B1 | 3/2001 | Chapin | |
| 6,211,971 B1 | 4/2001 | Specht | |

(Continued)

OTHER PUBLICATIONS

Non-Final Office Action dated Apr. 8, 2008 from the corresponding U.S. Appl. No. 10/755,131.

(Continued)

*Primary Examiner*—Madeleine A Nguyen
(74) *Attorney, Agent, or Firm*—Katten Muchin Rosenman LLP

(57) ABSTRACT

A graphical scanner for scanning a graphical image includes a source for producing an optical beam, a monochromator for dividing the optical beam into a plurality of component beams for hyperspectral bandpasses, a director for directing the component beams to illuminate portions of the graphical image, a sensor for measuring a light intensity for the one or illuminated portions, and a translator for transforming the measured light intensities for each of the one or more portions into hyperspectral traces each representing a spectral power distribution. The translator further transforms the hyperspectral traces into one or more device-independent representations of color.

6 Claims, 5 Drawing Sheets

U.S. PATENT DOCUMENTS

| | | |
|---|---|---|
| 6,269,182 B1 | 7/2001 | Ishii |
| 6,337,923 B1 | 1/2002 | Yoon et al. |
| 6,464,412 B1 | 10/2002 | Stoebe et al. |
| 6,495,818 B1 | 12/2002 | Mao |
| 6,552,788 B1 | 4/2003 | Castle |
| 6,646,743 B2 | 11/2003 | Herman et al. |
| 6,690,466 B2 | 2/2004 | Miller et al. |
| 6,771,400 B2 | 8/2004 | Kleiman |
| 7,042,643 B2 | 5/2006 | Miles |
| 7,310,581 B2 * | 12/2007 | Mound ......... 702/28 |
| 7,433,042 B1 * | 10/2008 | Cavanaugh et al. ......... 356/419 |
| 2003/0001121 A1 | 1/2003 | Hochstein |
| 2003/0139886 A1 | 7/2003 | Bodzin et al. |
| 2004/0085542 A1 * | 5/2004 | Soliz et al. ......... 356/456 |
| 2005/0036661 A1 * | 2/2005 | Viggh ......... 382/109 |
| 2005/0151965 A1 * | 7/2005 | Bissett et al. ......... 356/328 |
| 2006/0247514 A1 * | 11/2006 | Panasyuk et al. ......... 600/410 |
| 2008/0035834 A1 | 2/2008 | Gleckler |
| 2009/0295910 A1 * | 12/2009 | Mir et al. ......... 348/61 |
| 2009/0326383 A1 * | 12/2009 | Barnes et al. ......... 600/476 |
| 2010/0020319 A1 * | 1/2010 | Demos et al. ......... 356/301 |
| 2010/0056928 A1 * | 3/2010 | Zuzak et al. ......... 600/476 |
| 2010/0185067 A1 * | 7/2010 | Gupta ......... 600/323 |

OTHER PUBLICATIONS

Non-Final Office Action dated Dec. 30, 2008 from the corresponding U.S. Appl. No. 10/755,131.

* cited by examiner

| | Buffer Name | Data Type | Symbol | # of Tables | Description |
|---|---|---|---|---|---|
| 39 | | | | | |
| 41 | Spectral Power Distribution | Fixed Operators | $S_\lambda$ | 12 | CIE and non-CIE illuminants |
| 42 | Color Matching Functions | Fixed Operators | $\bar{x}_\lambda, \bar{y}_\lambda, \bar{z}_\lambda$ | 2 | CIE Observers |
| 43 | Normalization Function | Fixed Operator | k | 24 | $100/\Sigma S_\lambda \bar{y}_\lambda$ |
| 44 | Bandpass $\bar{x}$ Transform Operator | Fixed Operators | $S_\lambda \bar{x}_\lambda$ | 24 | $S_\lambda \bar{x}_\lambda$ |
| 45 | Bandpass $\bar{y}$ Transform Operator | Fixed Operators | $S_\lambda \bar{y}_\lambda$ | 24 | $S_\lambda \bar{y}_\lambda$ |
| 46 | Bandpass $\bar{z}$ Transform Operator | Fixed Operators | $S_\lambda \bar{z}_\lambda$ | 24 | $S_\lambda \bar{z}_\lambda$ |

| | Buffer Name | Data Type | Symbol | # of Tables | Description |
|---|---|---|---|---|---|
| 38 | | | | | |
| 47 | White Point Buffer | Variable Data | $WP_\lambda$ | 2 | Sensor saturation |
| 48 | Black Point Buffer | Variable Data | $BP_\lambda$ | 2 | Sensor noise |
| 49 | RC Buffer | Variable Data | $RCT_\lambda$ | 95 | Uncorrected ADC output |
| 50 | % Transmitted Buffer | Variable Data | $T_\lambda$ | 95 | Corrected ADC output |
| 51 | Bandpass $\bar{x}$ Buffer | Variable Data | $\Sigma T_\lambda S_\lambda \bar{x}_\lambda$ | 1 | Sum for X |
| 52 | Bandpass $\bar{y}$ Buffer | Variable Data | $\Sigma T_\lambda S_\lambda \bar{y}_\lambda$ | 1 | Sum for Y |
| 53 | Bandpass $\bar{z}$ Buffer | Variable Data | $\Sigma T_\lambda S_\lambda \bar{z}_\lambda$ | 1 | Sum for Z |
| 54 | XYZ Buffer | Variable Data | X, Y, Z | 1 | Normalized sums for X, Y, Z |

FIG. 7

SYSTEM FOR CAPTURING GRAPHICAL IMAGES USING HYPERSPECTRAL ILLUMINATION

FIELD OF THE INVENTION

The present invention relates to the field of technical reproduction of graphical images. In particular, it relates to a system for measuring and transforming light from individual elements, or pixels, that comprise an image, to produce a hyperspectral trace, representing a spectral power distribution, that can be further transformed by the system into a number of device-independent color space formats, including device-independent color space formats defined by the Commission Internationale de l'Eclairage (CIE).

BACKGROUND OF THE INVENTION

Colorimetry, or the science of color, has evolved over several centuries of experimentation to develop robust models for specifying human color perception. A good summary of the foundations of color science is provided in U.S. Patent Publication US-2002-0159098-A1, entitled "Hyperspectral System For Capturing Graphical Images", published on Oct. 31, 2002 and hereby incorporated by reference.

Conventional apparatus for capturing colored graphical images utilize a method based upon an industrial implementation of a central color science concept, the Trichromatic Generalization, which explains how colors mix and match. In the conventional scheme, a coordinate system characterized as a Device Dependent Color Space (DDC) utilizes linear mixtures of three arbitrary primary colors to match the color of individual pixels of the original.

The origin of the scientific Trichromatic Generalization has its basis in human physiology. The sensation of color is a complex interaction of the human nervous system with light, electromagnetic radiation found between the wavelengths of 300 nm and 830 nm. Ordering the psychological designations of color perception creates the visible spectrum, from short to long wavelengths, violet, blue, green, yellow, orange, and red. The color matching rules of the Trichromatic Generalization are used to predict how mixtures of the different wavelengths are perceived by humans. Complicating the mechanical aspects of color perception are visual system anomalies.

The human eye's lens brings different wavelengths of light to focus at different distances behind the lens and absorbs almost twice as much blue light as yellow or red, resulting in a relative insensitivity to shorter wavelengths, a condition exaggerated by age. The light that finally passes through the eye strikes the retina, a small area at the back of the eye densely packed with individual light sensitive receptors connected to the optic nerve, the conduit that transmits and processes visual sensations from the eye to the visual cortex in the brain. It has been shown the light sensitive photoreceptors are of two kinds, rods, which function at night or at very low light levels, and cones, which function under daylight conditions and are the sole source of color perception sensations in humans. The cones are circularly situated at the center of the eye's focal area, the fovea, with the rods forming a ring around the cones.

The notion of "tri" associated with the Trichromatic Generalization arises from the relative sensitivity of the three different cone types generally accepted to be found within the fovea. About 64% of cones exhibit peak sensitivity to 575 nm wavelength light and are said to be red sensitive, though the 575 nm bandpass is actually perceived as yellow. Thirty two percent of cones are considered green, most sensitive to 535 nm light, and only two percent are blue, having a peak response at about 445 nm. It is generally believed analyzing the ratio of the neural activities generated by visually stimulating the three different photoreceptors is the method by which the human visual system interprets color. In practice, it has been shown that the channels of information from the three cones are transformed into three new so-called opponent channels, transmitting a red to green ratio, a yellow to blue ratio and a brightness factor, based upon red and green only, to the brain's visual cortex. The physiological sensations produced by visual stimulus are thought to be correlated with stored psychological perceptions, creating color vision.

The above described physiology allows perception of the physical aspects of color, electromagnetic radiation found between the wavelengths of 380 nm and 780 nm, referred to here as human-visible light. Physically, color perception varies according to the wavelength of the visual stimulus. Wavelength is calibrated in nm (nanometer) denominated units, with groups or multiple wavelengths described as bandwidth. When the bandpass of the bandwidth is narrow, the resulting perceptions are associated with pure, or highly saturated, color. As the observed bandpass widens, the color appears less pure. Observers with normal color vision generally identify pure blue as light with a wavelength of about 470 nm, pure green as light with a wavelength of about 535 nm, pure yellow as 575 nm light, and pure red as 610 nm light. However, individual observers often respond differently to the same specimen, so what is a pure color to one may not be perceived that way by another observer.

Besides wavelength, other important physical attributes of visible light are luminance, illuminance, transmittance (reflectance) and metamerism. Luminance accounts for light emitted, such as from a computer display, calibrated in units that reflect the eye's uneven sensitivity to different wavelengths. Illuminance is a measurement of the amount of light that falls on an observed object and transmittance (reflectance) is the measurement of light photons that are absorbed and regenerated as new photons in proportion to the amount of original photons that transmitted through (reflected off) the surface of the object. Various wavelengths of light that are absorbed and retransmitted through (reflected off) a measured image (or specimen) and presented as a percentage of the wavelengths of light that initially struck it can be described as the image's (specimen's) characteristic spectral transmittance (reflectance) curve.

It is useful to consider that the reproduction of a colored image may be thought of as an exercise in color matching which takes into account the spectral power distribution of the light source (ie: viewing conditions) illuminating the original, the characteristic curve of the original, the power distribution of the light source illuminating the reproduction, and the characteristic curve of the reproduction. When the characteristic curve of the source's power distribution is combined with the spectral transmittance of the specimen, a visual stimulus is created which triggers color perception. Mathematically characterizing the color perception triggered by the combination of a source's power distribution and a specimen's transmittance curve is a necessary first step in successfully reproducing the perception.

There is, however, a phenomenon that impacts color perception and therefore color reproduction; metamerism. To illustrate the phenomenon, consider two specimens with identical characteristic curves. They will appear to the average observer to match under any source of illuminance. Now, consider two specimens with different curves. They will appear to vary with regards to one another as the source of the illumination is varied. However, there can be two specimens that appear to match despite having different characteristic curves. This is metamerism. An example of metamerism is when the two specimens with different characteristic curves are observed under different sources of illumination, and a match is observed under one of the sources. Because the reproduction of colored images entails taking into account different viewing conditions and media, the mathematical characterization of a color perception destined for reproduction must take into account metameric matches. A color measurement system capable of identifying and predicting metamerism is the CIE system (devised by the Commission Internationale de l'Éclairage).

The CIE system includes non-linear color model transformations and procedures to account for different viewing conditions and visual phenomena such as metamerism and color contrast. And, to simplify color matching, the CIE system uses mathematical means, imaginary primaries designated X, Y and Z, to eliminate color matching possibilities that require a minus primary value to make a match. The X, Y and Z primaries create a superset of color which includes all colors a human might perceive. This is a key difference as compared to the physical primaries integrated into current graphical imaging systems, whose color gamut (or range of producible colors) is a subset of human color perception.

The three primary colors X, Y and Z utilized by the device independent CIE color model are mathematical abstractions based upon statistical analysis of the response of different observers to color specimens compared in a highly standardized manner. For example, the CIE has defined a standard manner for observing a color match which requires observing a structure free specimen field that subtends 2° of arc when positioned 45 cm (18 inches) from the eye's iris. By correlating the results of these observations with precise and accurate measurements of a visual stimuli's physical color properties, a device independent system able to correctly measure human color perception is created.

Devices currently utilized to quantify color for reproduction means use color systems that require actual samples of real primary colors (usually red, green and blue, i.e. R, G, B) be present to make measurements. Light is transmitted through a colored object and through filters that isolate the primary colors. Upon exiting the primary filters the light, effected by the optical density and color of the object, as well as the three primary color filters, is measured and noted as three integer values, one each for the R, G and B primary component created by the device for the object measured. This method creates a measurement process tied to a specific physical color space, with all the inherent color gamut limitations of physical rather than imaginary primaries. The methods and techniques used to create and measure the R, G and B components of a physical color space vary from vendor to vendor and are without any common standards.

Although a convenient way to describe colors, the limitation of any device dependent system is that regardless of how the three primary colors are chosen, observer metamerism effects (where two objects appear to some observers or devices to have the same color, but to other observers or devices the same objects do not match) cannot be eliminated. Values expressed by a device dependent color system are accurate only within a truncated color space, and only if the exact same filters, lights, inks or pigments used to render a particular color are used as the physical primaries in the measuring device, which is an impossibility. That being the case, it has been recognized that more information than is contained in a device dependent color model is needed to produce accurate color reproduction.

Despite it's known inaccuracy, device dependent color-based measuring and rendering systems have been integrated into virtually all industrial and commercial applications related to the processes that are called upon to reproduce full color images, such as printing, photography and television. Over generations the conflict of accurately measuring and rendering with physical color systems has lead to extensive trade practices being established. These practices, commonly referred to as "color correction," integrate human judgment with the physical color systems in a way that requires humans to make decisions to resolve or mask the inherent limitations of a physical color system. In physical color image scanning methods, humans are expected to compensate for differences between the color content of the original image, what a scanner can capture of the original color content, how the scanner describes what it captured, and how the captured data must be adjusted for use by various digital, xerographic and lithographic rendering processes.

By agreement, the CIE, (Commission Internationale de l'Eclairage), since 1913, has developed standards regarding how the Trichromatic Generalization is interpreted, as well as how color is measured and described. The underlying premise of the CIE system, referred to as CIE-31, is that the stimulus for color is provided by the proper combination of a source of light, an object, and an observer. In 1931 the CIE introduced standardization of the source and observer and the methodology to derive numbers that provide a measure of a color seen under a standard source of illumination by a standard observer. This standardization forms the foundation of modern colorimetry. CIE-31 uses a specimen's Characteristic Curve for the calculation of Tristimulus Values X, Y, and Z and Chromaticity Coordinates x and y. The CIE-76 recommendations establish transformations of the X, Y, and Z Tristimulus Values into nearly visually uniform color scales such as CIELAB, and also established a method to quantify differences between two color specimens.

CIELAB (L*a*b*), the result of a non-linear transformation of X, Y and Z, is an opponent-type system that assumes a color cannot be red and green at the same time, or yellow and blue at the same time, though it can be both red and yellow (ie: orange) or red and blue (ie: purple). Therefore, a specimen's redness or greenness can be expressed as a single number, called a*, which is positive if the color is red and negative if it is green. It follows that yellowness or blueness is designated by the coordinate b*, positive for yellow and negative for blue. The third coordinate, L*, is the lightness of the color.

The full benefit of the CIE system has not been taken advantage of by the graphic arts industry with regards to image scanning. Recently, devices capable of measuring 1 nm and 5 nm wide bandpasses of radiant energy (sometimes referred to as "hyperspectral" in the literature) have been developed (see, e.g. U.S. Patent Publication US-2002-0159098-A1). For example, the graphical image scanner disclosed in U.S. Patent Publication US-2002-0159098-A1 includes a light source to illuminate the graphical image, a collector to segment the image into a plurality of pixels and collect light emanating from the plurality of pixels, a hyperspectral analyzer to divide the collected light into a plurality of hyperspectral bandpasses and measure a light intensity for each of the hyperspectral bandpasses, a calculator to transform the measured light intensities for the plurality of hyperspectral bandpasses into a device-independent representation of color for each of the pixels, a processor with stored program control to format the device-independent color representations for the plurality of pixels as a digital data file, and a memory for storing the digital data file. This scanner does however incorporate complex electronic and electro-optical hardware which result in a scanner cost and footprint that exceeds requirements for may smaller enterprises. Accordingly, it would be desirable to develop a hyperspectral graphical image scanner of reduced size and cost suitable for smaller enterprises.

SUMMARY OF THE INVENTION

Disclosed is a method and apparatus for creating a digital master of a graphical image in a hyperspectral form. The digital master created in hyperspectral form may be further transformed into 1) device-independent, scientific calorimetric notation defined by the Commission Internationale de l'Eclairage (CIE) and 2) device-dependent calorimetric notation, or left untransformed in the form of 3) calorimetric characteristic curves. Each of the transformed and untransformed forms may be stored in a specialized data file or buffer for further use.

The disclosed apparatus, in one embodiment, is a graphical image scanner optimized to capture film-based graphical images. The purpose of a graphical image scanner is to determine and save, at a pre-selected spatial resolution, a color value for each individual picture element, or pixel, of an image.

A novel aspect of the disclosed method and apparatus is the use of a hyperspectral source of illumination, which allows measurement of the relative hyperspectral power distribution of a pixel's light, therefore qualifying the use of CIE-defined device-independent data transformations to determine pixel color.

In one disclosed embodiment of the invention, a method is defined to comprise the steps of: a) dividing a light beam from an illumination source into a plurality of component beams each representing one of a plurality of hyperspectral bandpasses, wherein the plurality of hyperspectral bandpasses define a spectrum characterized by wavelengths ranging continuously between 360 and 830 nanometers, and wherein the component beam for each hyperspectral bandpass is characterized by a substantially unique and non-overlapping selection of continuous wavelengths from the spectrum, b) successively illuminating one or more portions of the graphical image with each of the plurality of component beams, c) measuring a light intensity with a sensor for each of the one or more illuminated portions of the graphical image with respect to each of the plurality of component beams, d) transforming each measured light intensity into a relative light intensity based on minimum and maximum light intensities measured by the sensor, and e) saving the relative light intensities in a buffer as a hyperspectral trace. The saved hyperspectral trace may then be further transformed to produce one or more CIE device-independent color models for the image. The hyperspectral trace may also be transformed to produce one or more RGB device-dependent color models for the image.

BRIEF DESCRIPTION OF THE DRAWINGS

A more complete understanding of the invention may be obtained by reading the following description of specific illustrative embodiments of the invention in conjunction with the appended drawing in which:

FIG. 7 further describes the fixed and variable buffers of FIG. 6; and

In the various figures, like reference numerals wherever possible designate like or similar elements of the invention.

DETAILED DESCRIPTION OF THE PREFERRED EMBODIMENTS

The following detailed description includes a description of the best mode or modes of the invention presently contemplated. Such description is not intended to be understood in a limiting sense, but to be an example of the invention presented solely for illustration thereof, and by reference to which in connection with the following description and the accompanying drawing one skilled in the art may be advised of the advantages and construction of the invention.

Figure 1:
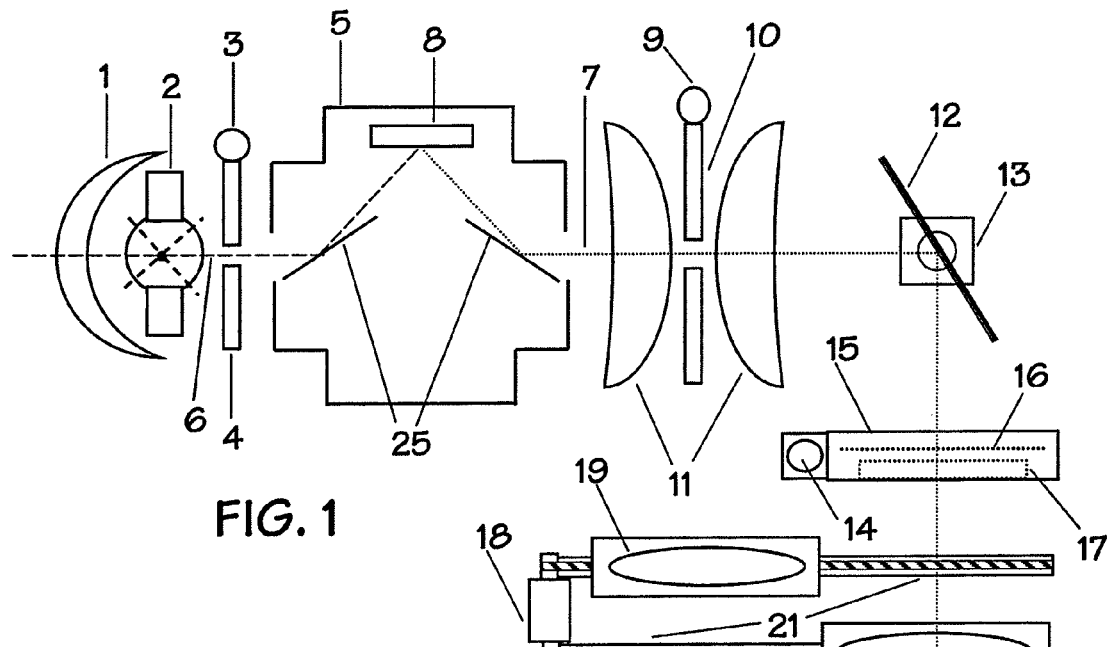
FIG. 1 provides a schematic diagram illustrating the principle components of an embodiment of the present invention, and their interrelationships.

The disclosed spectral scanner creates pixels optically. With reference to FIG. 1, the output 6 of a white light source 2 is directed by a reflector 1 along an optical path through an iris diaphragm 4 controlled by a servo motor 3. Iris diaphragm 3 regulates the overall intensity of the white light entering the hyperspectral bandpass creation apparatus 5 (for example, a monochromator). Mirrors 25 in the apparatus 5 direct the output of the white light source 2 (for example, a continuous portion of the electromagnetic spectrum located between 360 nm and 830 nm) to reflect off an optical grating 8. The grating is capable of separating the white light 6 into a plurality of narrow hyperspectral bandpasses of light 7 containing continuous segments of the light spectrum, for example, 1 nm or 5 nm in width. These hyperspectral bandpasses 7 exit the apparatus 5 and are condensed and focused by optics 11 and formed into a spot by an iris diaphragm 10 controlled by a servo motor 9. The spot is deflected off of a scanning mirror 12 controlled by a servo motor 13, which sweeps the spot, for example, across a 1 mm high slit 16.

The slit 16, aligned in the optical path in a fixed position, is built into a translation stage 15 controlled by a servo motor 14. The stage 15 holds an image 17 (for example, a standard 35 millimeter (mm) slide film image) perpendicular to the optical path and behind the slit as it steps the image through the optical path under the control of the application software 29 further illustrated in FIGS. 5 and 6. Therefore, as the spot is swept across the translation stage slit 16, it illuminates a specific portion of the image (designated the "scan line"). Depending on the magnification factor option selected by the user, the scan line may be focused by one or more of lenses 19, 20 mounted as movable stages on tracks 21. This arrangement allows the lenses 19, to be moved into and out of the optical path, for example, by a servo motor 18. The scan line is projected by lenses 19, 20 onto an area light sensor 24 mounted on a translation stage 23 controlled by a servo motor 22.

Figure 2:
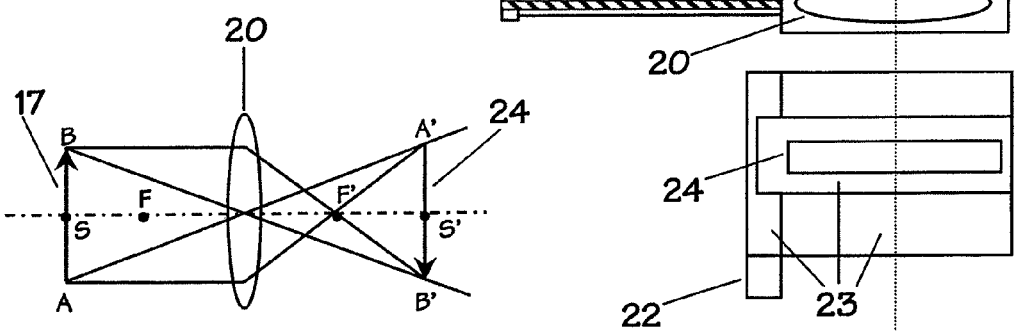
FIG. 2 illustrates a first image magnification as provided by lens 20 of FIG. 1.
Figure 3:
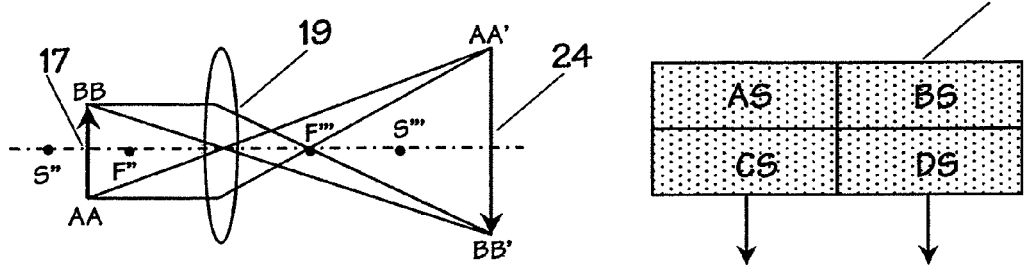
FIG. 3 illustrates a second image magnification as provided by lens 19 of FIG. 1.

FIG. 2 illustrates the relationship of the optical components when the magnification factor is 100%, and FIG. 3 illustrates the relationship of the optical components when the magnification factor is 163%. The orientation of the image, magnification factor and spatial resolution of the individual light sensitive elements of the area sensor determine the spatial scanning resolution achieved by the device. Lenses 19, 20 are controlled, for example, by magnification lens change servo 18 of FIG. 5 via host computer system 30, application software 29, servo amplifier bus 31 and servo amplifier 33.

To illustrate, a 35 mm image (image 17 represented by ray AB in FIG. 2) with a horizontal dimension of 1.35 inches and a vertical dimension of 0.92 inches is inserted into the translation stage 15 with its longer axis parallel to the slit ("landscape" mode). With lens 20 set as illustrated in FIG. 2 (100% magnification), a 1 mm high by 1.35 inch wide image of the scan line is projected onto the area sensor 24 (represented as ray A'B' imaged on sensor 24 in FIG. 2). In FIGS. 2 and 3, according to convention, F, F', F" and F'" represent focal lengths of the associated lenses 20, 19, and S, S', S", S'" each represent an associated 100% magnification point (twice the associated focal length).

Figure 4:
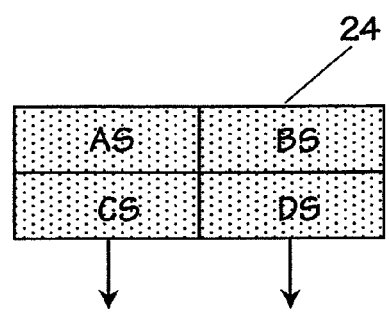
FIG. 4 provides a schematic diagram illustrating sensor 24 of FIG. 1.
Figure 5:
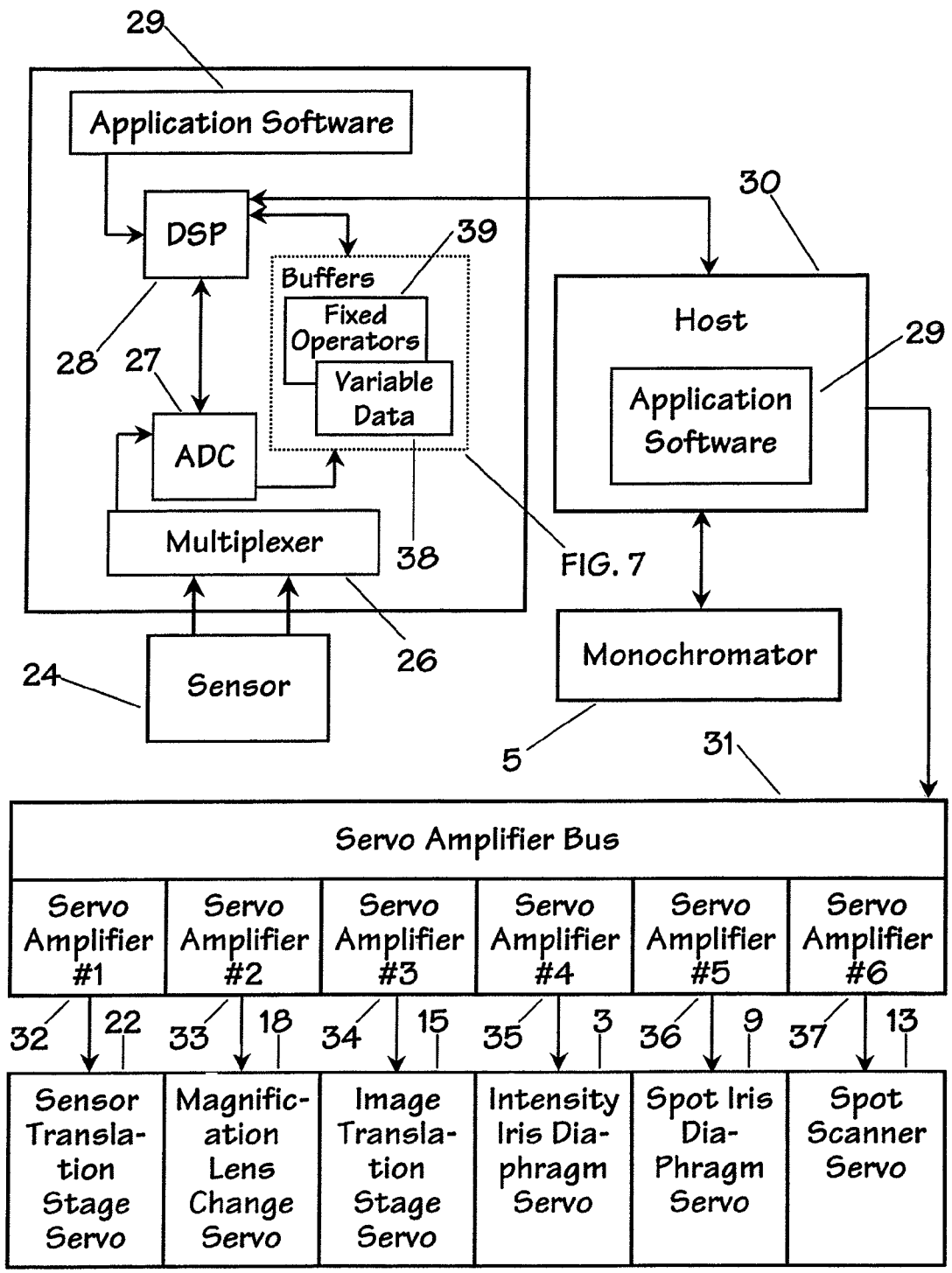
FIG. 5 provides a schematic diagram further illustrating components of the embodiment of FIG. 1, including an associated host computer system, a digital signal processor (DSP), an analog to digital converter (ADC), servo control circuitry and data processing circuitry.

The area sensor 24 of FIGS. 1, 4 and 5 may be, for example, composed of four quadrants, AS, BS, CS and DS. Quadrants AS and BS are configured to directly receive light transmitted via lenses 19, 20, and quadrants CS and DS act as transfer buffers for transferring light signals to the multiplexer 26 of FIGS. 5 and 6. This arrangement improves the sensor's throughput by allowing the device to both capture image data and transfer image data simultaneously and in parallel. Sensor 24 may be properly aligned with the transmitted light image by causing host computer system 30 and application software 29 to control sensor translation stage servo 22 via servo amplifier 32.

Each quadrant of the sensor 24 may contain, for example, 1,242,060 5 μm (μm=micron) dimensioned sensor elements arranged in 3810 columns and 326 rows, creating an active image area of 7620×326 pixels, 1.5 inches wide by 1.63 mm high. Each transfer area of the sensor 24 is of equal size. Therefore, when the landscape mode image is projected onto the sensor at 100% magnification, the scan line is reduced to a 6,858×200 pixel matrix and the image is scanned at an optical resolution of 5,080 pixels per inch.

When the image 17 is inserted into the translation stage 15 in portrait mode, the shorter axis of image 17 is parallel to the slit 16, and the optics are adjusted as illustrated in FIG. 3. (image 17 in FIG. 3 illustrated as image line AABB), the image is magnified by 163%. Therefore, the 0.92 inch by 1 mm scan line is projected onto the full active area of the sensor, 1.5 inches×1.63 mm (the image on sensor 24 illustrated in FIG. 3 as image line AA'BB') a matrix of 7,620×326 pixels, and the image is scanned at an optical resolution of 8,283 pixels per inch.

Figure 6:
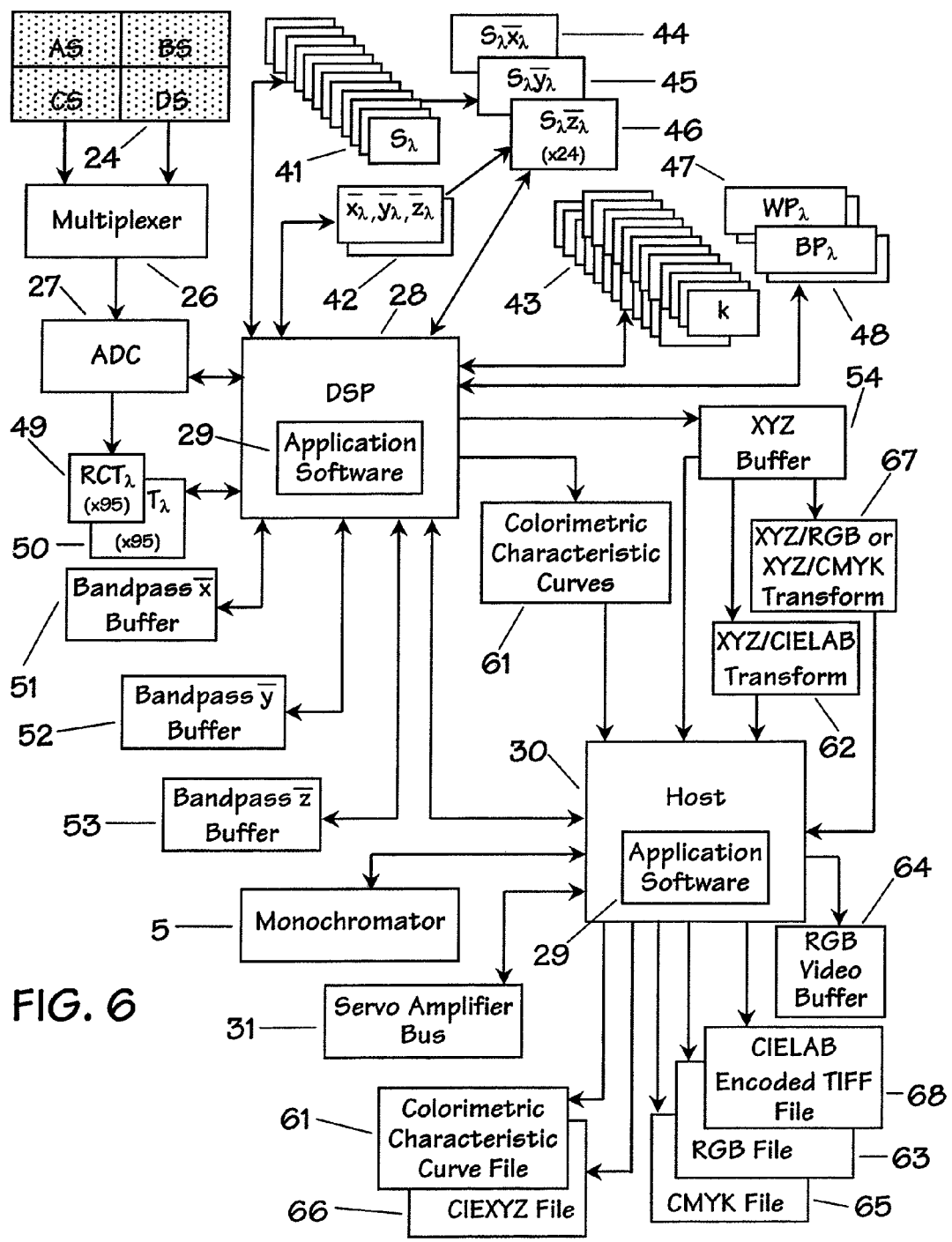
FIG. 6 further illustrates the data processing circuitry of FIG. 5, as well as fixed and variable buffers, data files and other logic elements associated with the data processing circuitry of FIG. 5.

The scanning process, or movement and measurement of the image, occurs in a multi-part automated cycle controlled by the application software 29 and host computer system 30, as illustrated for example in FIGS. 5 and 6. First the image settles, then the system illuminates the image by systematically sweeping a plurality of spots, composed of hyperspectral bandpasses between the wavelengths of 360 nm and 830 nm, across the scan line. Host computer system 30 causes the sweeping of spots by controlling intensity iris diaphragm servo 3 via servo amplifier 35, spot iris diaphragm 9 via servo amplifier 36, and spot scanner servo 13 via servo amplifier 37, as well as by manipulating monochromator 5.

Figure 8:
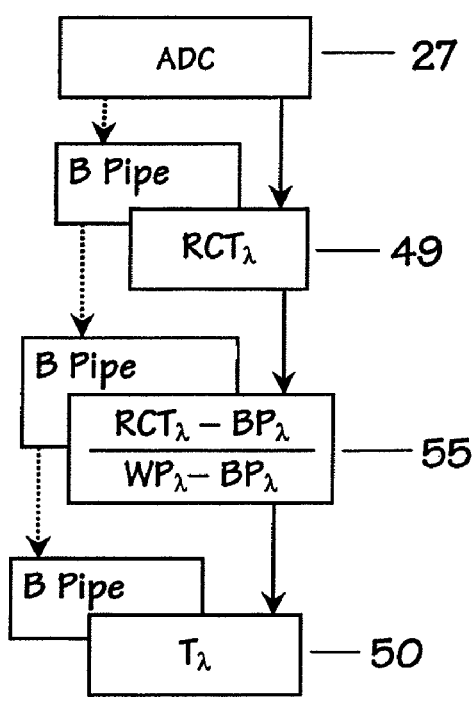
FIGS. 8-11 illustrate successive steps in a pipelining process employed by the data processing circuitry of FIGS. 5 and 6.

As the spot illuminates the scan line, the sensor 24 both determines the intensity of the light transmitted through the image and breaks the scan line into pixels corresponding to individual scan elements of the sensor 24. Signals are output from the individual scan elements of sensor 24, multiplexed by multiplexer 26, and converted to digital form by analog to digital converter (ADC) 27. The resulting digital signals are temporarily stored and processed in bandpass (λ) delineated buffers 50, 51, 52, 53 and 54 of variable buffers 38 as shown in FIGS. 6 and 8, scan line by scan line, in alternating pipelined hardware buffers ("B Pipes") as illustrated in FIGS. 8-11. By means of application software 29 and digital signal processor (DSP) 28, the system may for example simultaneously perform normalization and CIE-defined mathematical operations on the stored data in one pipe as it continues to capture and fill the alternative pipe with more bandpass delineated pixel intensity data.

After the scan line has been illuminated with all appropriate hyperspectral bandpasses of light, the host computer system 30 of FIG. 5 moves the image to bring a new 1 mm high scan line into the optical path by controlling image translation stage servo 15 via servo amplifier 34. As it brings the next scan line into the optical path, the DSP 28 and application software 29 store the processed pixel data in buffers 38.

The user can direct the system to save data as a colorimetric characteristic curve representing the spectral power distribution of each pixel and/or have the system transform and save the pixel-delineated spectral power distribution data as CIE-defined or non-CIE colorimetric Tristimulus values.

Typically, it takes the system 125 mS (milliseconds) to both sweep a spot across the slit and then switch bandpasses when in portrait mode, and 185 mS when in landscape mode. When using bandpasses calibrated to a 5 nm spectral resolution, the system makes 95 sweeps per scan line, for a total scan time per scan line of 11.88 seconds in portrait mode and 17.58 seconds in landscape mode. In portrait mode at 163% magnification, the system analyzes 2,484,120 pixels per scan line, or 209,101 pixels per second. In landscape mode at 100% magnification, the system analyzes 1,371,600 pixels per scan line, or 78,020 pixels per second. As there are 35 scan lines in a 35 mm image in portrait mode and 24 in landscape mode, it takes 6.93 minutes to scan the image in portrait mode and 7.03 minutes in landscape mode.

The disclosed system uses CIE-defined specifications to measure and transform objects such as pixel light into color values. The CIE system assumes that the Stimulus for Color is provided by the proper combination of a Source of Light, an Object, and an Observer. Some time ago the CIE, at set wavelength intervals (λ) calibrated in nm, mathematically standardized Sources of Light via Power Distribution Tables for Standard Illuminants (S) and standardized Observers via Color Matching Function Tables for Standard Observers (x, y, and z). The CIE also developed a methodology that uses Standardized Illuminants, Standardized Observers and the Relative Spectral Power Distribution (T) of the Object to derive numbers that are designated the Colorimetric Tristimulus Values X, Y and Z, and which provide a standard measure of an Object's color. This methodology is mathematically expressed as:

$$X = k \sum_{360}^{830} T_{(\lambda)} S_{(\lambda)} \bar{x}_{(\lambda)} \qquad [1]$$

$$Y = k \sum_{360}^{830} T_{(\lambda)} S_{(\lambda)} \bar{y}_{(\lambda)} \qquad [2]$$

-continued $$Z = k\sum_{360}^{830} T_{(\lambda)} S_{(\lambda)} \bar{z}_{(\lambda)}$$ [3]

where k is a normalization constant:

$$k = 100 \Big/ \sum_{360}^{830} S_{(\lambda)} \bar{y}_{(\lambda)}$$ [4]

and where specific tables for spectral power distribution $S_\lambda$ and color matching functions $\bar{x}$; $\bar{y}$ and $\bar{z}$ are all functions of the CIE-defined wavelength interval (λ). The bandpasses created for $T_\lambda$ by sweeping a plurality of hyperspectrally-calibrated spots across the scan line are also defined by the CIE-specified wavelength interval (λ).

FIGS. 1 and 4 describe the primary optical, electro-optical and mechanical components and systems and their arrangement. FIG. 5 describes the primary electronic and electromechanical components and their logical arrangement. FIG. 6 illustrates the process components and their relationship to the primary system components described in FIGS. 1, 4 and 5. FIG. 7 describes the logical buffers and buffer data created and used by the system and its processes, and FIGS. 8, 9, 10 and 11 illustrate the methodology of the data conversion process, described by equations 1-4.

Before image scanning commences, the dynamic range of the system must be established by calibrating each light sensor pixel. With reference to FIG. 1, for calibration, the output 6 of the white light source 2 is directed through the hyperspectral apparatus 5 in such a way as to allow a continuous portion of spectrum between the wavelengths of 360 nm and 830 nm to pass through the device. With the magnification optics 19, 20 set in the desired position, and no image 17 in the translation stage 15, the intensity iris diaphragm 4 controlled by a servo motor 3 is adjusted by the application software 29 resident in the host computer system 30 of FIG. 5. As illustrated in FIG. 5, application software 29 in host computer system 30 adjusts iris diaphragm 4 by issuing digital commands to the servo motor 3 via the #4 servo amplifier 35. When the signals exiting the light sensor equal its saturation point, the maximum amount of light the sensor is able to measure in a linear fashion before it overloads, or blooms, the White Point, WP, for the component, has been determined.

Once WP is established, as illustrated in FIG. 5, the hyperspectral apparatus (monochromator) 5 adjusts, under the control of the application software 29, to output narrow bandpasses of spectrum designated $WP_\lambda$, at the appropriate interval (λ). Assuming a 5 nm spectral interval, the system steps through the 360 nm-830 nm continuous spectrum in 5 nm bandpasses, saving a value for each sensor pixel at each bandpass in the $WP_\lambda$ Buffer 47 as illustrated in FIGS. 6 and 7.

Following collection of the $WP_\lambda$, the intensity iris diaphragm 4 is closed and the 95 measurements are repeated, thereby creating a value for each pixel at each hyperspectral bandpass (λ) that is designated the Black Point, $BP_\lambda$. $BP_\lambda$ represents the threshold of electronic noise, or the minimum amount of light the individual light sensor pixels can measure. When the $BP_\lambda$ is subtracted from the $WP_\lambda$, the resulting value represents the calibrated linear dynamic range for each pixel.

FIG. 8 illustrates how the $WP_\lambda$ and $BP_\lambda$ values are used to calculate $T_\lambda$, the percentage of light transmitted through the image 17 and captured by individual pixels. At each hyperspectral bandpass interval (λ) the portion of the image represented by the scan line is illuminated by a sweep of the spot. The light transmitted through the image, collected by the sensor 24 and processed by the ADC 27 is raw count digital data designated $RCT_\lambda$ stored in RC buffer 49 as illustrated in FIGS. 6, 7 and 8. The $BP_\lambda$ for the appropriate pixel at the appropriate bandpass interval (λ) is then subtracted from the appropriate $RCT_\lambda$, and this value is then divided by the result of the appropriate ($WP_\lambda - BP_\lambda$) operation (illustrated as calculation 55 in FIG. 8). This calculation produces $T_\lambda$, the percentage of light transmitted through the image for the appropriate pixel at the appropriate bandpass interval (λ). This value is stored in the $T_\lambda$ buffer 50 as illustrated in FIGS. 6, 7 and 8, and represents what the CIE defines as the spectral power distribution of the object, in the CIE system of measurement and transformation of color stimulus.

Figure 9:
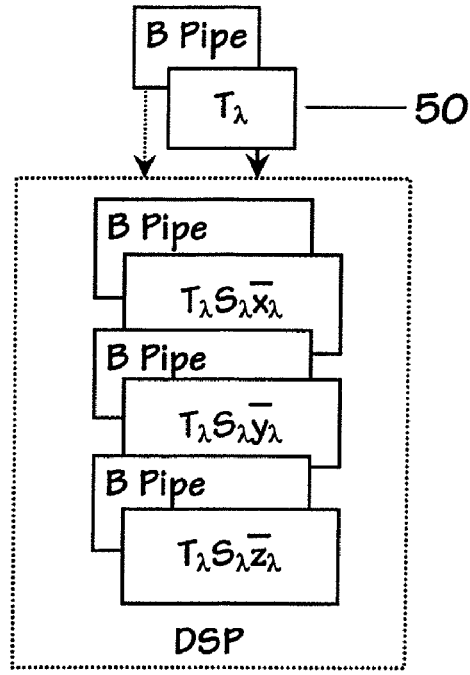
Figure 10:
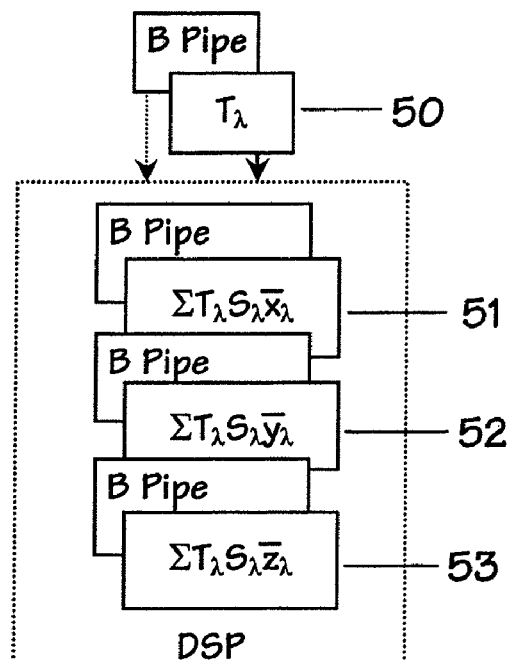
Figure 11:
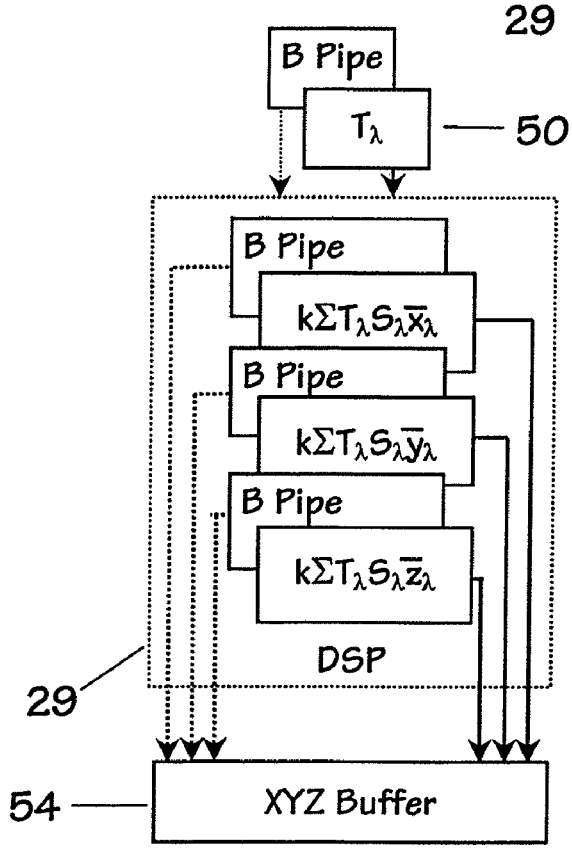

FIGS. 9, 10 and 11 describe how $T_\lambda$ is then mathematically processed by the DSP 28 with spectral power distribution $S_\lambda$ and color matching functions $\bar{x}_\lambda$, $\bar{y}_\lambda$ and $\bar{z}_\lambda$ to express the CIE Tristimulus Values X, Y and Z. Values for $S_\lambda$, $\bar{x}_\lambda$, $\bar{y}_\lambda$ and $\bar{z}_\lambda$ are respectively stored in Illuminant spectral power distribution buffer 41 and Observer color matching function buffer 42 illustrated in FIGS. 6 and 7.

As illustrated for example by FIGS. 6, 7 and 8, values from the $T_\lambda$ buffer 50 for each bandpass interval (λ) are multiplied by DSP 29 with appropriate values from the appropriate Bandpass $\bar{x}$, Bandpass $\bar{y}$ and Bandpass $\bar{z}$ Transform Operator buffers 44, 45, 46 to produce the Bandpass delineated intermediate values $T_\lambda S_\lambda \bar{x}_\lambda$, $T_\lambda S_\lambda \bar{y}_\lambda$ and $T_\lambda S_\lambda \bar{z}_\lambda$ held by in data buffers controlled by DSP 29 as illustrated in FIG. 9. As illustrated in FIG. 10, Bandpass delineated intermediate values $T_\lambda S_\lambda \bar{x}_\lambda$, $T_\lambda S_\lambda \bar{y}_\lambda$ and $T_\lambda S_\lambda \bar{z}_\lambda$ are summed to respectively total Bandpass delineated sum values $\Sigma T_\lambda S_\lambda \bar{x}_\lambda$, $\Sigma T_\lambda S_\lambda \bar{y}_\lambda$ and $\Sigma T_\lambda S_\lambda \bar{z}_\lambda$, and Bandpass delineated sum values $\Sigma T_\lambda S_\lambda \bar{x}_\lambda$, $\Sigma T_\lambda S_\lambda \bar{y}_\lambda$ and $\Sigma T_\lambda S_\lambda \bar{z}_\lambda$ are respectively stored in Bandpass $\bar{x}$, Bandpass $\bar{y}$ and Bandpass $\bar{z}$ buffers 51, 52, 53.

FIG. 11 illustrates the completion of the transformation of the individual pixels of the active scan line buffers. Bandpass delineated sum values $\Sigma T_\lambda S_\lambda \bar{x}_\lambda$, $\Sigma T_\lambda S_\lambda \bar{y}_\lambda$ and $\Sigma T_\lambda S_\lambda \bar{z}_\lambda$ are each multiplied by the appropriate normalization factor k from normalization function buffer 43 of FIGS. 6 and 7, with the final product for each pixel in the scan line being computed as the Tristimulus Values X, Y and Z. Tristimulus Values X, Y and Z are stored in XYZ buffer 54 illustrated in FIGS. 6 and 7.

The operator has the option of saving the $T_\lambda$ values of each pixel in calorimetric characteristic curve file 61 of FIG. 6 before further processing into XYZ values. This file represents the spectral power distribution for each image pixel, and it may be further processed after image capture using any logical combination of Illuminant and Observer. This choice gives the user increased flexibility to transform the data to conform with specific reproduction requirements which may be unknown at the time of image capture, at the cost of a larger initial data file.

Once the colorimetric characteristic curve data, or $T_\lambda$ values, have been reduced to XYZ Tristimulus Values, the user may specify other CIE-defined transformations, for example, including the XYZ to CIELAB transform 62 (illustrated in FIG. 6), which the system can perform in real-time as it is scanning an image to store in TIFF form in a CIELAB encoded TIFF file 68.

As illustrated for example in FIGS. 5 and 6, application software 29 operates digital signal processor (DSP) 28 to transform a pixel's Tristimulus Values X, Y and Z into a new set of three values, locating the pixel's color in the three-dimensional L*a*b* (CIELAB) color space, a device independent color space acknowledged to mathematically represent human color perception. The XYZ to CIELAB methodology is mathematically expressed as:

$$L^* = 116(Y/Y_n)^{1/3} - 16 \quad [5]$$

$$a^* = 500[(X/X_n)^{1/3} - (Y/Y_n)^{1/3}] \quad [6]$$

$$b^* = 200[(Y/Y_n)^{1/3} - (Z/Z_n)^{1/3}] \quad [7]$$

where:

$X/X_n$; $Y/Y_n$; $Z/Z_n > 0.01$ and $X_n$, $Y_n$, $Z_n$ are the Tristimulus values of the Illuminant selected with $Y_n$ equal to 100 obtained by use of the same normalization method used to obtain X, Y, Z.

When one or more of the ratios $X/X_n$, $Y/Y_n$, $Z/Z_n$ is less than 0.01 or if $Y/Y_n \leq 0.008856$ for $$L^* = 116(Y/Y_n)^{1/3} - 16 \quad [5]$$

Then $$L^* = 903.3(Y/Y_n) \text{ where } (Y/Y_n) \leq 0.008856 \quad [8]$$

and $$a^* = 500[f(X/X_n) - f(Y/Y_n)] \quad [9]$$

$$b^* = 200[f(Y/Y_n) - f(Z/Z_n)] \quad [10]$$

Where $f(X/X_n) = (X/X_n)^{1/3}$ when $X/X_n > 0.008856$ and $f(X/X_n) = 7.787(X/X_n) + 16/116$ when $X/X_n \leq 0.008856$ and $f(Y/Y_n) = (Y/Y_n)^{1/3}$ when $Y/Y_n > 0.008856$ and $f(Y/Y_n) = 7.787(Y/Y_n) + 16/116$ when $X/X_n \leq 0.008856$ and $f(Z/Z_n) = (Z/Z_n)^{1/3}$ when $Z/Z_n > 0.008856$ and $f(Z/Z_n) = 7.787(Z/Z_n) + 16/116$ when $Z/Z_n \, 0.008856$.

The system user may also choose to have the XYZ values that are generated by the scanner stored as a data file 66 or transformed via matrix operations 67 to additive device dependent RGB color values 63 that also can be displayed by the host computer via the RGB buffer 64. Before this transformation can begin, the scanning system must be provided with a matrix of values representing the XYZ values of the primary colors of the target RGB system. The user may also choose to transform the XYZ values to subtractive CMYK device dependent color values 65, via transform 67.

The foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A method for transforming light intensities measured by a sensor for a portion of a graphical image into a device-independent representation of color for the image portion, the method comprising the steps of:

receiving by a processor an output signal from the sensor indicative of a light intensity for the image portion for each of a plurality of hyperspectral bandpasses, wherein the plurality of hyperspectral bandpasses define a spectrum characterized by wavelengths ranging continuously between 360 and 830 nanometers, and wherein the component beam for each hyperspectral bandpass is characterized by a substantially unique and non-overlapping selection of continuous wavelengths from the spectrum;

converting each of the output signals for the plurality of hyperspectral bandpasses into a raw count digital data ($RCT_\lambda$) value;

calculating by another processor a relative normalized intensity value ($T_\lambda$) for each of the plurality of hyperspectral bandpasses as a function of the $RCT_\lambda$ value, a white point ($WP_\lambda$) value and a black point ($BP_\lambda$) value, wherein the $WP_\lambda$ value is indicative of a light intensity that saturates the sensor and the $BP_\lambda$ value is indicative of a threshold electronic noise level of the sensor;

storing the $T_\lambda$ value for each of the plurality of hyperspectral bandpasses as a hyperspectral trace representing a spectral power distribution;

calculating bandpass delineated intermediate values ($T_\lambda S_\lambda x_\lambda$, $T_\lambda S_\lambda y_\lambda$, $T_\lambda S_\lambda z_\lambda$) for each of the plurality of hyperspectral bandpasses as a function of the $T_\lambda$ value, a user-selected Illuminant value ($S_\lambda$) and user-selected Observer values ($x_\lambda$, $y_\lambda$, and $z_\lambda$);

calculating bandpass delineated sum values ($\Sigma T_\lambda S_\lambda x_\lambda$, $\Sigma T_\lambda S_\lambda y_\lambda$, $\Sigma T_\lambda S_\lambda z_\lambda$) for the image portion by respectively summing each of the bandpass delineated intermediate values ($T_\lambda S_\lambda x_\lambda$, $T_\lambda S_\lambda y_\lambda$, $T_\lambda S_\lambda z_\lambda$) for all of the plurality of hyperspectral bandpasses;

calculating tristimulus values (X, Y, Z) for the image portion respectively as $k\Sigma T_\lambda S_\lambda x_\lambda$, $k\Sigma T_\lambda S_\lambda y_\lambda$, and $k\Sigma T_\lambda S_\lambda z_\lambda$, where a constant k is calculated as $100/\Sigma S_\lambda y_\lambda$; and storing the tristimulus values (X, Y, Z) for the image.

2. The method of claim 1, further comprising the steps of:
calculating image values for the image portion for one or more additional device-independent color space models as a function of the stored tristimulus values (X, Y, Z); and storing the calculated image values for each of the one or more additional device-independent color space models as a computer-readable data file.

3. The method of claim 2, wherein the one or more additional device-independent color space models are selected from the group consisting of CIELAB, CIELUV and CIE xyY models.

4. The method of claim 1, further comprising the steps of:
calculating image values for the image portion for one or more device-dependent color space models as a function of the stored tristimulus values (X, Y, Z); and storing the calculated image values for each of the one or more additional device-dependent color space models as a computer-readable data file.

5. The method of claim 4, wherein the one or more device-dependent color space models are selected from the group consisting of additive RGB and subtractive CMYK models.

6. The method of claim 1, wherein where the stored hyperspectral trace is used to recalculate alternate Tristimulus Values X, Y, and Z in conjunction with one or more alternatively selected Illuminant values ($S_\lambda$) and alternatively selected Observer values ($\bar{x}_\lambda, \bar{y}_\lambda,$ and $\bar{z}_\lambda$).

\* \* \* \* \*